(12) United States Patent
Torres

(10) Patent No.: US 6,250,395 B1
(45) Date of Patent: Jun. 26, 2001

(54) APPARATUS SYSTEM AND METHOD FOR INSTALLING AND RETRIEVING PIPE IN A WELL

(76) Inventor: Carlos A. Torres, 748 Blalock Rd., Houston, TX (US) 77024

( * ) Notice: Subject to any disclaimer, the term of this patent is extended or adjusted under 35 U.S.C. 154(b) by 0 days.

(21) Appl. No.: 09/571,134

(22) Filed: May 15, 2000

Related U.S. Application Data

(60) Provisional application No. 60/163,869, filed on Nov. 5, 1999.

(51) Int. Cl.$^7$ ................................................. E21B 23/00
(52) U.S. Cl. .......................... 166/382; 166/73; 166/77.2; 166/384
(58) Field of Search ................................. 166/67, 69, 72, 166/73, 77.2, 378–382, 384; 405/9, 10, 3

(56) References Cited

U.S. PATENT DOCUMENTS

| | | |
|---|---|---|
| 2,453,038 | 11/1948 | Rossmann . |
| 2,548,616 | 4/1951 | Priestman et al. . |
| 3,618,679 | * 11/1971 | Crooke . |
| 3,724,567 | 4/1973 | Smitherman . |
| 3,987,910 | * 10/1976 | Brunato . |
| 4,848,455 | 7/1989 | Fenyvesi . |
| 5,547,314 | 8/1996 | Ames . |
| 5,975,207 | 11/1999 | Smitherman . |

* cited by examiner

Primary Examiner—Roger Schoeppel
(74) Attorney, Agent, or Firm—Browning Bushman, P.C.

(57) ABSTRACT

Pipe used in drilling and/or completing wells is stored in long rectilinear segments or strings in the space adjacent a drilling rig being used to construct a well. The pipe is introduced into the well, or extracted from the well, in long segments made up of multiple individual pipe sections. In one embodiment, long rectilinear segments of pipe are bent into a curve that extends from the rig to the space surrounding the rig, where the pipe re-assumes its rectilinear shape. The curve radius is greater than the pipe's yielding bending radius. On a water-based rig, the pipe is received in the water surrounding the rig where it may be stored, tested, inspected, reassembled, treated, and/or otherwise processed. The pipe may be received within a long pipe storage sleeve that is buoyed laterally at or below the water surface or it may be secured to a guy line anchored between the rig and the water bottom. In deepwater applications, long sections of the pipe are stored vertically in the water area between the surface drilling rig and the water bottom. The pipe may also be stored within vertically oriented storage sleeves. In a modified form of the invention, the long pipe sections are moved laterally for storage in the area between the rig and the water bottom without being first pulled to the water surface. The bottom of each stored section is made up or broken out at the subsea wellhead. The pipe section may also be stored within the riser.

77 Claims, 9 Drawing Sheets

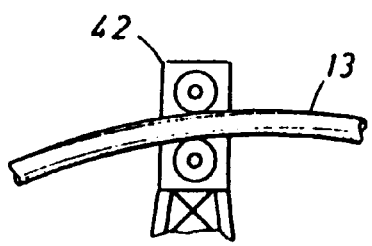
FIG. 12
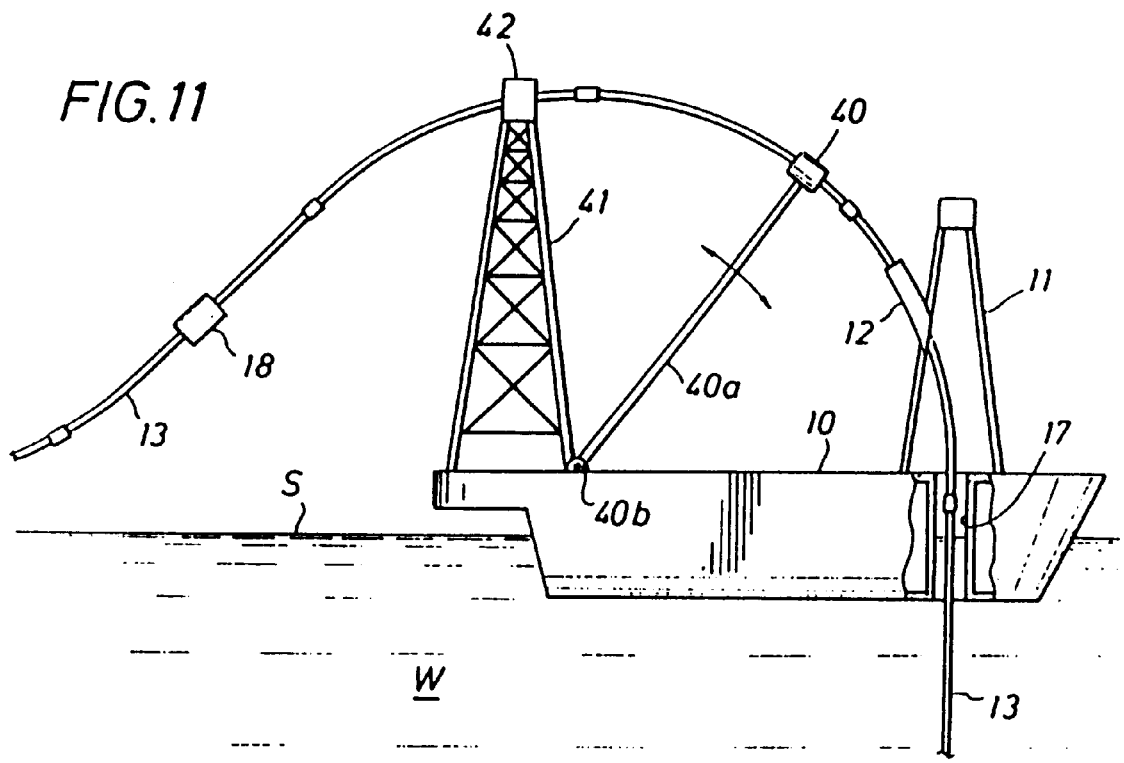
FIG. 11
FIG. 13

APPARATUS SYSTEM AND METHOD FOR INSTALLING AND RETRIEVING PIPE IN A WELL

RELATED APPLICATIONS

This application is related to Provisional Application Ser. No. 60/163,869, filed on Nov. 5, 1999.

BACKGROUND OF THE DISCLOSURE

1. Field of the Invention

The present invention relates generally to the construction of wells and more specifically to the handling and storage of pipe used in the drilling, completion and workover of wells. The primary applicability of the invention is for wells constructed through deep-water bodies of 3,000 ft. or more in depth. The invention also has utility in the construction of certain onshore wells and offshore wells drilled through shallower water bodies.

2. Background of the Prior Art

The pipe used in constructing wells is typically assembled with individual pipe sections, referred to as "joints", that are secured together, end-to-end, to form a pipe string. The different pipe strings used in the construction of the well include drill strings, work strings, casing strings, and tubing strings, as well as others.

The drill strings and work strings are employed in drilling and/or repairing the well. The drill strings and work strings may be run into and out of the well many times during the initial well construction or during the performance of subsequent well modifications or repair.

The casing and tubing strings are generally a permanent part of the well and are respectively used to maintain the well bore structure and to convey produced well fluids to surface production facilities. The casing is generally run into the well during the initial well construction and is not usually retrieved during the normal life of the well. The tubing string is usually run into the well once and remains in the well during normal operation of the well. In some cases, the tubing must be withdrawn from the well to repair or workover the well. The term "string" may be used to designate two or more connected joints of pipe.

The major equipment component used to drill a well is generally referred to as a drilling rig. In many cases, after the well is drilled, the drilling rig is removed and smaller rigs called completion or workover rigs are employed to complete the well construction. The smaller rigs are also used to workover wells that have been previously drilled by a larger drilling rig. For convenience, the terms "drilling rig" or "drilling platform" or "drilling structure", as employed herein in the description of the present invention, may be used to include drilling, workover and completion rigs and other analogous equipment such as hydraulic snubbers that may be used in the construction of a well. The term "drilling" may be used to include the procedures of drilling, completing and working over a well as well as other related aspects of the construction of a well. The term "drill string" may be used to include tubing strings, work strings, casing strings and other pipe strings that may be employed in the construction of a well.

The equipment used to construct wells varies from small land-based rigs to enormous deep-water rigs. The water based rigs include platform mounted rigs, jackup rigs, semisubmersible rigs, drill ships, tension leg platforms and various other types and kinds of structures. These drilling rigs have, in common, a drilling rig "floor" from which the drilling operations are primarily initiated and controlled. The water-based rigs also typically employ a string of riser pipe that extends between the rig and an underwater wellhead located on the water bottom. The riser pipe is used in the construction of the well and, in some cases, may be used during the production of the well.

The individual pipe joints used in the construction of a drill string are transported from a storage location and assembled end-to-end on the drilling rig. The assembled joints form a string that is lowered into the well. When the string is withdrawn from the well, the individual joints are removed from the string at the drilling rig floor and transported to a storage location.

A large part of the time required to construct a well is expended in assembling and disassembling the string and handling the pipe joints as they are moved between the storage location and the well. Personnel working on the rig floor using manually operated handling tools usually do the work of assembling and disassembling the string. The work is time consuming and can be hazardous.

The cost of a well is directly related to the time required to construct the well. The cost considerations become critically important in the drilling of deep-water wells because the deep water drilling rigs and the required support services are extremely expensive. Operating costs of $10,000 per hour, or more, may be incurred in deep- water drilling operations.

Deep-water drilling rigs employ specialized, complex equipment to store, assemble, and disassemble the pipe strings. Pipe withdrawn from the well is disassembled on the rig floor and may be stored on horizontal pipe racks located on the drilling structure. For convenience and timesavings, the pipe, such as drill pipe, that is run into and out of the well a number of times, is stored vertically in "stands" within the rig derrick. The stands are made up of three joints secured end-to-end and extend approximately 90 ft. up into the derrick.

Some newer deep-water rigs are equipped with tall derricks that handle stands of four joints. The addition of the extra joint in each stand reduces the number of times that the drill string must be disconnected and reconnected as it is withdrawn and rerun back into the well. The addition of the extra joint reduces the time required to run and retrieve the drill string and reduces the handling damage done to the string while connecting and disconnecting the joints.

It is apparent that even greater benefits could be achieved if the length of the stands could be increased beyond the current limit of four joints. However, using conventional techniques, the derrick height places a practical limit on the length of the stands. The maximum stand length for a stand of four joints of drill pipe is typically less than 125 ft.

Using coiled pipe can offset some of the disadvantages of using jointed pipe to work in wells. Coiled pipe is a continuous, non-jointed string of steel pipe that is stored on large reels situated on the rig structure. Coiled pipe eliminates the need to make and break the connections between individual joints of a pipe string and permits continuous pipe injection or extraction. The driving system employed to inject the coiled pipe into the well grips the pipe, straightens it, and continuously feeds it from the reel into the well. The driving system re-bends the pipe and coils it back onto the reel as the pipe is extracted from the well. Coiled pipe can be run and extracted much faster than conventional jointed pipe.

While coiled pipe may be quickly injected into and retrieved from a well, it has limited use in well construction.

Coiled pipe suffers from the disadvantage of not being rotatable within the well. Moreover, the requirement to repeatedly straighten and re-bend the pipe beyond its non-yielding curvature limits the size and strength of the pipe. This limitation, in turn, restricts the pipe's ability to withstand forces normally encountered in the drilling and completion of wells, particularly deep, high-pressure wells.

The prior art has suggested storing a column of conventional jointed drill pipe or tubing in a continuous piece without breaking it into shorter sections. U.S. Pat. No. 3,724,567 to Smitherman teaches moving a pipe column in an upwardly and radially outwardly curved path from the well bore to a substantially horizontal attitude for storage preferably in a generally circular configuration on the ground or support means for later return to the well bore moving approximately along the same path, and as one piece. Smitherman discloses a pipe elevator system that can continuously remove the drill string from the well bore. A support and a guide are used to redirect the pipe from the vertical to the storage location and position.

The Smitherman apparatus, when employed in an offshore installation, is described as supporting the stored drill pipe on the drilling barge in a rotatable, circular storage rack. The drill string is bent as it is redirected from the derrick down to the circular storage rack and then bent again as it is coiled into the storage rack. The bending radius of the pipe is sufficiently large to prevent yielding so that the pipe will return to a straight posture once the bending forces are removed. The diameter of the storage rack must be at least twice the length of the permissible bending radius with the result that the rack requires significant space on the drilling barge.

U.S. Pat. No. 5,547,314 to Ames describes a system and method for storing a continuous link of an assembled jointed tubular conduit on an offshore vessel and for conveying the tubular conduit between a deck of a vessel and a subsurface well head on the floor of the body of water. The vessel carries a carousel positioned around its perimeter. The assembled tubular conduit is maintained in coiled storage within the carousel. Horizontal and vertical directing means are provided that, in cooperation with rotation of the carousel, enable uncoiling of the tubular conduit from the carousel into the well or recoiling of the tubular conduit into the carousel from the well.

Like the Smitherman apparatus, the Ames system and method store the well tubular on the offshore vessel in a rotatable carousel. The Ames carousel encircles the perimeter of the vessel. To prevent yielding the jointed drill pipe, the radius of the carousel is maintained greater than that of the smallest bending radius of the pipe. Also, as the with the Smitherman apparatus, the drill pipe is bent as it leaves the derrick and is redirected toward the carousel and then bent again as it is directed into the carousel.

U.S. Pat. No. 4,848,455 to Fenyvesi describes an apparatus for deep drilling in which the pipe sections are connected together with special flexible connections permitting the pipe string to be stored on the surface in a circular storage casing smaller than that possible with the rigid pipe connections of the Smitherman or Ames designs. Fenyvesi describes a pipe connection that permits bending between the connected joints when the pipe is to be stored. The connection can be locked to prevent such bending when the pipe is inserted into the well.

Relatively complex, expensive equipment is required to provide a carousel and to effect the necessary compound bending and carousel rotation that are part of the prior art storage designs. The requirement for special flexible joints in the drilling string, while reducing the space requirements of the carousel, adds additional complexity and cost to the drilling operation.

Each of the described prior art pipe storage designs occupies a large area on the vessel and requires that the vessel support the weight of the stored pipe.

SUMMARY OF THE INVENTION

A central object of the present invention is to employ the space adjacent and surrounding a drilling rig for the purpose of storing assembled, jointed pipe used in the construction of the well.

A primary object of the present invention is to store long strings of jointed pipe in the area surrounding the drilling rig to reduce the number of times that joints in the string must be connected and disconnected.

A related object of the present invention is to store the pipe used in the construction of a well in the area surrounding the drilling rig so that the drilling rig is not burdened with the load and space requirements of the pipe.

Drill pipe, such as for example, 6 ⅝-inch, E-grade drill pipe having a tensile strength of 75,000 psi used in drilling deep wells may be bent into a curve having a radius of curvature slightly greater than 100 ft. without yielding the pipe. The permissible bending radius becomes smaller with drill pipe having higher tensile strengths. For example, 6 ⅝-inch drill pipe, S-grade, having a tensile strength of 135,000 psi has a permissible bending radius of approximately 60 ft. Using a 50 percent safety factor, the largest radius of curvature required for bending the stiffest of these pipes is approximately 160 ft. Accordingly, a curving guide structure with a circular diameter of slightly more than 300 ft. can redirect a string of 6 ⅝-inch, E-grade drill pipe through an arc of 180 degrees without yielding the pipe material. The S-grade pipe may obviously be bent within such a guide without any yielding of the pipe material.

If the drill pipe is redirected as it leaves the drilling rig floor, the guide structure required to redirect the drill pipe through a 180 degree turn need only be 160 ft. higher than the rig floor. The drill pipe in such a structure can extend vertically downwardly into the water adjacent the rig at a distance 320 ft. away from the point at which it exits the well from the rig floor.

The large vessels currently employed for deep water drilling can easily accommodate bending structures having diameters of more than 320 ft. For example, the Transocean Sedco Forex deep-water drilling rig, the Discoverer Enterprise, has a length of 835 ft., a beam of 125 ft., a derrick height of 226 ft., and a moon pool that is 80 ft. long by 30 ft. wide.

It will be appreciated and that the radius of the guide required for curving the pipe increases with the stiffness of the pipe that is to be redirected. The bend radius is selected based on the stiffest pipe to be employed in the system. The peak height at the top of the guide arch is also dictated by the selection of the radius of curvature. Additionally, the height above the rig floor at which the pipe begins to bend as it rises above the rig floor determines the peak height at the top of the guide arch. The higher the beginning of the bending point, the higher the resulting peak in the arch of the pipe. The lowest peak in the arch is achieved when the pipe begins its curve at the rig floor.

The same considerations determine the lateral spacing between the exit point of the pipe on the rig floor and the point at which the pipe completes its 180-degree reversal of direction. The minimum lateral spacing is obtained when the pipe curve begins immediately at the rig floor. Most practical pipe handling systems would preclude beginning the pipe curvature at the rig floor, however, the added peak and lateral spacing dimensions imposed by beginning even large diameter curves at some point above the drilling rig floor are easily accommodated within the structure of the large deep-water drilling rigs.

One form of the invention curves the pipe string extracted from the well from the drilling floor to the water surrounding the drilling structure. The pipe enters the water through a second work area of the drilling structure. Personnel at the second work area can inspect the pipe, engage or disengage pipe connections and otherwise process the pipe before it enters the water storage area. Similar functions are performed at the second work area when the pipe is withdrawn from the water to be inserted into the well.

One storage technique of the invention extends the pipe laterally out into the water in a continuous string. The string is submerged to a depth that protects it from wave action and surface vessel traffic.

In another embodiment of the invention, the pipe is separated into long stands and secured vertically in the water, supported from the drilling structure or from a separate buoyant racking system.

One modification of the invention stores the pipe within a storage sleeve deployed in the water. The storage sleeve may be constructed from a string of casing joints or other large diameter pipe. The storage sleeve protects the well pipe from the seawater and prevents chemicals or contaminants on the well pipe from washing into the seawater. The sleeve may be filled with a chemical solution that retards corrosion or otherwise treats the stored pipe.

When the methods of the invention are used on a mobile drilling vessel, a remotely operated propulsion device is connected to the storage sleeve or to the ends of the pipe strings to maintain proper position of the sleeve or pipe as the water currents change or as the drilling vessel changes its orientation. When the methods are used on a stationary drilling structure, guy lines extending between the water body floor and the stationery drilling structure may be employed to maintain proper positioning of the stands or strings or sleeves deployed in the water.

In another embodiment of the invention, controlled buoyancy devices are attached to the laterally extending strings (or sleeves) to regulate the depth of the string in the water or, to float the string on the water surface.

An important feature of the present invention is that it permits the pipe used in the construction of a well to be run into and removed from the well quickly and with a minimum number of connection make-ups and breakouts. A related benefit of the method of the present invention is that pipe strings may be assembled and tested while the drilling rig is performing drilling operations. The pre-assembled and tested string may be quickly inserted into the well once the drill pipe is removed. The method eliminates the time normally expended in assembling and testing the pipe string as it is being lowered into the well.

Another method of the present invention comprises the steps of assembling and testing a well string at a remote location, towing the well string to a deep water location, and running the well string into the well at the remote location as a continuous string. In this method, the well string is fed from the water storage location through the curving guide to the drilling floor. The method permits the string to be assembled and tested at a specially designed remote facility at a cost substantially less than that required for assembling and testing the string at the deep-water location.

A feature of the second basic embodiment of the invention in which the stands are stored vertically in the space between the drilling rig and the water bottom may be used without raising the drill string above the drilling rig floor. The system finds its primary application in wells that are drilled without the use of a riser string. In such applications, an underwater makeup and breakout system disconnects the drill string at the underwater wellhead to free a stand of pipe. The stand is moved laterally away from the well and stored in the water area between the drilling rig and the water bottom. The stand may be supported from the drilling rig or may be supported by a separate, buoyant racking structure or may be supported within the riser pipe.

The system may include a continuous cable pulling/running system that engages the drill string at the underwater wellhead and extracts a length of the string from the well. The underwater system disconnects the extracted portion of the string to form a stand. The stand is then moved laterally and racked with previously removed stands of drill pipe. The underwater makeup system is used to reconnect the stands at the wellhead and the continuous running system is employed to reinsert the string in the well. In deep water applications where water depths may exceed 3,000 ft., only ten stands of pipe are required to store a 30,000 ft. string.

The continuous cable pulling/running system is employed to withdraw the stands from the well and to reinsert the string when it is run back into the well. The underwater makeup and breakout system is employed to assemble and disassemble the stands at the wellhead.

A modification of the vertical racking method is employed for wells drilled with a riser pipe. The inside diameter of the riser pipe is selected to be sufficiently large to accommodate multiple lengths of drill pipe in addition to the string of pipe extending into the well. The underwater breakout system disconnects individual pipe stands from the drill string at the underwater wellhead. The stands are moved laterally against the inside of the riser pipe and supported for storage within the riser pipe.

Storing the pipe in the water surrounding the rig frees up storage space on the rig and relieves the rig of the pipe weight. In the form of the invention that bends the pipe to the storage location, the structure required to direct the pipe from the rig floor into the water requires only a single bend. The need for a complicated, expensive and space-consuming carousel is eliminated while simultaneously freeing rig space and reducing the weight load on the drilling structure.

From the foregoing, it may be appreciated that an important object of the present invention is to use the bending characteristics of well pipe in the handling and storage of the pipe above the surface of the well.

Another object of the present invention is to use the space above the well surface and the space external to the rig structure for the purpose of handling and storing the well pipe in long, multi-joint pipe sections.

Yet another object of the present invention is the use of the space between an underwater wellhead and a drilling floor at the water surface for storing pipe used in the construction of a well.

Another object of the present invention is to store jointed pipe in long sections, or in a continuous string, to reduce the number of times that the connections between individual joints in the string must be made up or broken out.

A related object of the present invention is to store well pipe used by an offshore drilling rig at a storage location that does not require space on the rig.

It is yet another object of the present invention to assemble and store a string of pipe during the time that a well construction activity is being conducted on the well so that at the completion of such activity, the string may be inserted into the well as an assembled string without the delay associated with assembling individual joints of the string during the insertion process.

A related object of the present invention is to withdraw a string of pipe from a well without the time and activity involved in separating the string into multiple smaller pipe sections of three or four joints.

Another object of the present invention is to assemble a string of pipe using facilities on a drilling rig that are normally idle as the well is being drilled.

Yet another object of the present invention is to store long lengths of jointed pipe in a pipe storage sleeve disposed in the water surrounding an offshore drilling rig to separate the pipe from the water.

Another object of the present invention is to assemble an elongate string of pipe at the well surface and test or inspect the string of pipe at the well surface before the pipe is inserted into the well as an assembled string.

The foregoing, as well as other, objects, features, and advantages of the present invention will be better understood and appreciated from the following drawings, specification, and claims.

BRIEF DESCRIPTION OF THE DRAWINGS

FIG. 11 is a vertical elevation of the system of the present invention schematically illustrating a pivoting guide for directing the curving pipe through a tower-supported guide and into the water;

FIG. 12 is a partial, enlarged, vertical elevation of a roller guide employed at the top of the tower directing the pipe into the water;

FIG. 13 is a plan view of the drilling assembly of FIG. 11 schematically illustrating details in the construction and operation of a pivoting support guide of the present invention;

DESCRIPTION OF THE ILLUSTRATED EMBODIMENTS

Figure 1:
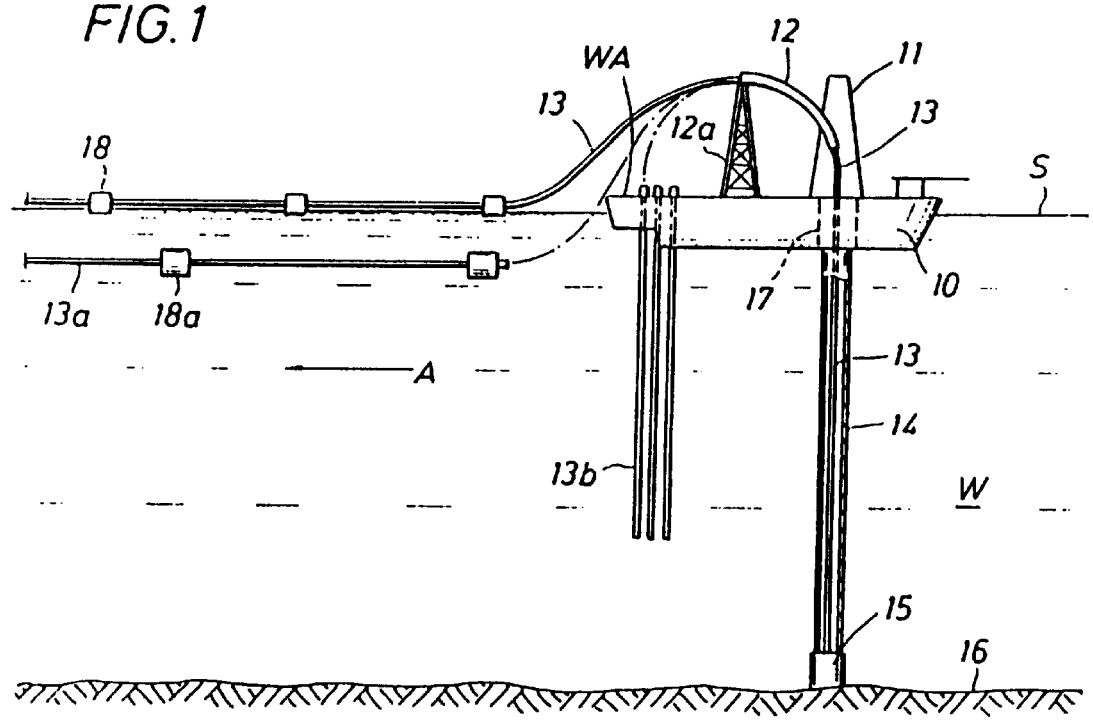
FIG. 1 is a vertical elevation schematically illustrating a drilling platform retrieving a string from a marine riser that extends between a subsea wellhead and the drilling platform.

With reference to FIG. 1, a drilling rig represented by a drill ship 10 provides a drilling platform with a mast 11 and a curving guide 12. The rig is illustrated extracting a string 13 from a marine riser pipe 14. The curved guide may be a tubular body or other suitable device such as a roller-guided track as commonly used to run coil tubing. Positive driving means may be included in the curved guide to move the pipe through the guide. The guide 12 is supported by a tower 12a.

The riser pipe 14 extends from a subsurface wellhead 15 supported on the seabed, through a body of water W and into a moon pool 17 of the drilling platform 10.

When pulling the string 13 out of the riser 14, the free end of the string is directed into the open end of the guide 12 and pushed through the guide to the far end of the guide and out onto the surface S of the body of water W. The traveling block or top drive of the rig 10 may provide the force moving the pipe or the force may be provided by other known positive drive mechanisms.

Three methods for storing pipe are illustrated in FIG. 1. All three methods may be employed simultaneously, alone or in any desired combination. In the first method, flotation devices 18 are attached at intervals along the length of the string to float the string on the water surface. The arrow A indicates the direction of the water current flow showing the string 13 trailing away from the drilling platform 10 in a downstream direction.

A second example of the pipe storage capability of the invention is indicated with a section of the string 13a being submerged below the surface of the water and supported by controlled buoyancy devices 18a. The buoyancy of the devices 18a may be controlled to maintain the string 13a at a desired depth below the water surface. Submerging the string section 13a protects it be from the surface wave motion and places it below the draft of surface vessels.

A third method for storing the pipe in the string 13 is depicted by pipe sections 13b suspended directly from the drilling rig 10. Each section 13b may be made up of multiple joints of pipe that can extend through the water to a point just above the sea floor 16.

The pipe 13 is directed to a work area WA where personnel and equipment may disassemble the string into the individual sections 13b. The work area WA is used to reassemble the sections 13b into a continuous string when the pipe is returned to the well.

Throughout the description hereof, similar components in the various embodiments of the invention are designated by the same reference characters.

Figure 2:
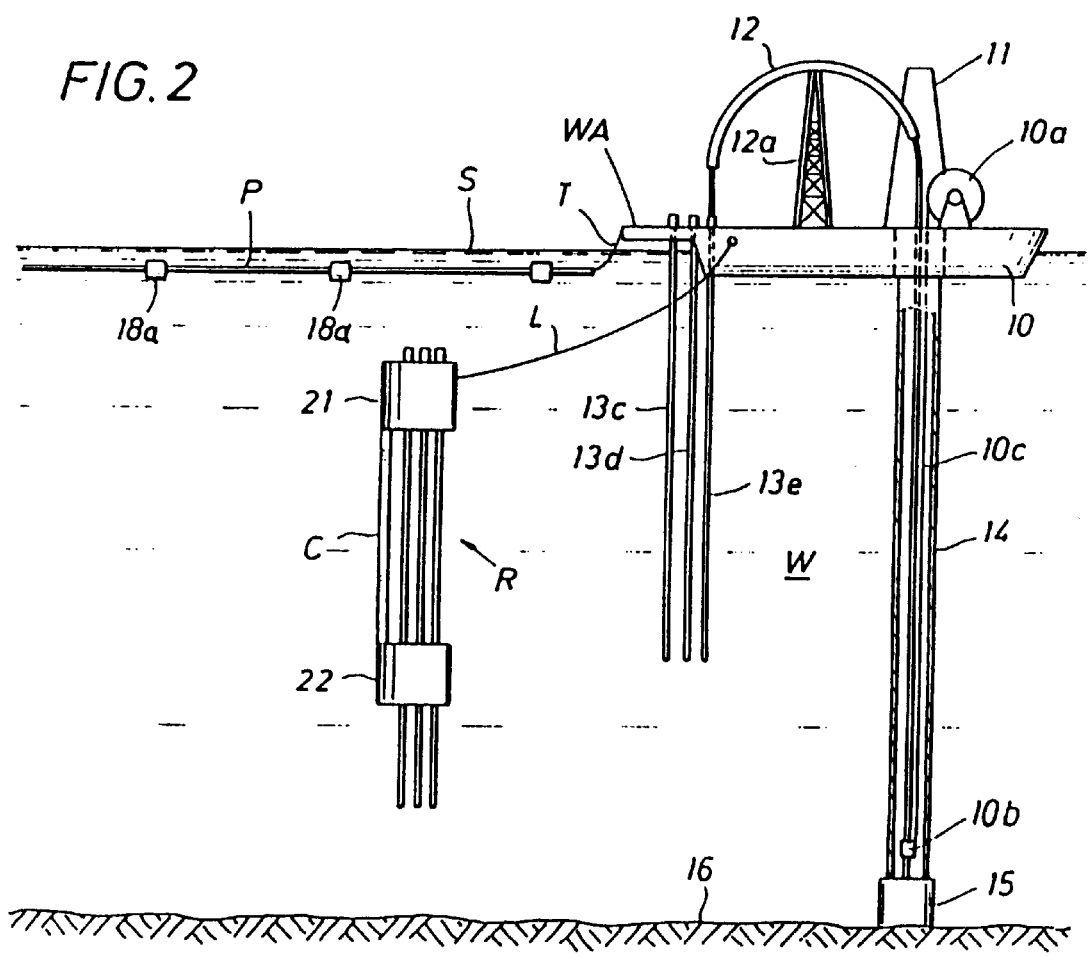
FIG. 2 is a schematic view similar to that of FIG. 1 illustrating a retrieved pipe string suspended from the drilling platform in three sections, a laterally deployed submerged pipe string and a tethered, submerged pipe racking system.

FIG. 2 illustrates a modified form of the invention for storing and handling pipe. The pipe string 13 is illustrated in three sections, 13c, 13d, and 13e, and supported from the drilling rig 10. The curved guide 12 is oriented to position the exiting pipe at the work area WA adjacent the end of the rig 10. As with the system illustrated in FIG. 1, personnel with pipe-holding and pipe-rotating tools at the work area WA can disconnect sections of pipe, or connect pipe sections as required to rack or unrack the pipe. Flotation devices 18a may also be attached to the string at work area WA for storage of the pipe as a single string.

A buoyant, submerged rack, indicated generally at R is tethered to the drilling rig 10 by a cable line L. Rack sections 21 and 22 contain ballast tanks that can be filled selectively with water or air to control the buoyancy of the racks. The two sections 21 and 22 may be bound together with a flexible restraining line C. If desired, the rack R may be floated from the water surface.

The fully assembled pipe string, as indicated at P, may be assembled at a distant location, such as a land-based assembly plant or a shallow water rig site and towed out to the deep-water rig. Adjustable buoyancy flotation devices 18a can be used to float the string on the surface or to support the string below the water surface, away from the wave action and surface vessels. The string P can be inspected, pressure tested and evaluated as an assembled structure while it is at the surface, thus eliminating rig time normally required for such procedures. The quality of the inspection is improved because of the ability to visually and directly test the assembled string.

Figure 3:
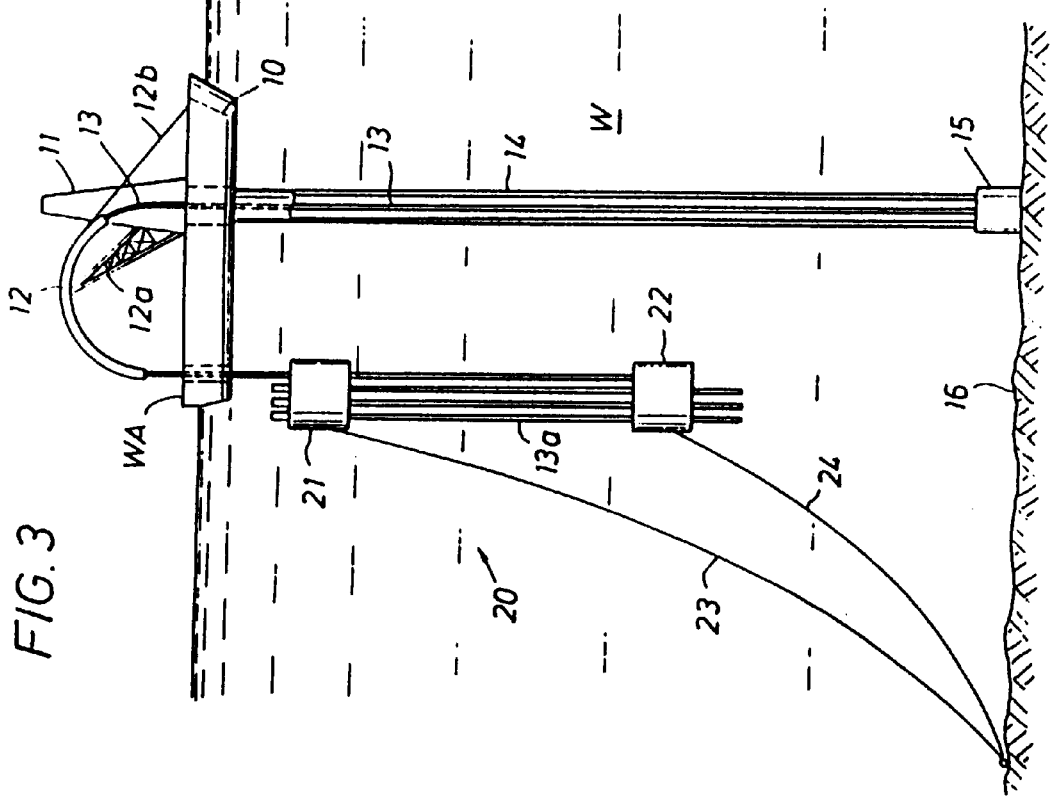
FIG. 3 is a schematic view illustrating a retrieved pipe string separated into sections and suspended from a submerged buoyant structure anchored to the sea floor.

FIG. 3 illustrates the pipe 13 stored independently of the drilling rig 10 in a submerged racking system indicated generally at 20. A cable 12b extending back to the stern of the drilling rig 10 reinforces the mast 11 and the guide 12.

The system 20 is comprised of two separate buoyant structures 21 and 22 that are guyed to the sea floor 16 by cables 23 and 24. Three sets of such cables at 120° spacing are employed to hold the racking structure 20 against vertical and lateral movement relative to the wellhead 15. Only one set of cables is illustrated in FIG. 3.

Figure 4:
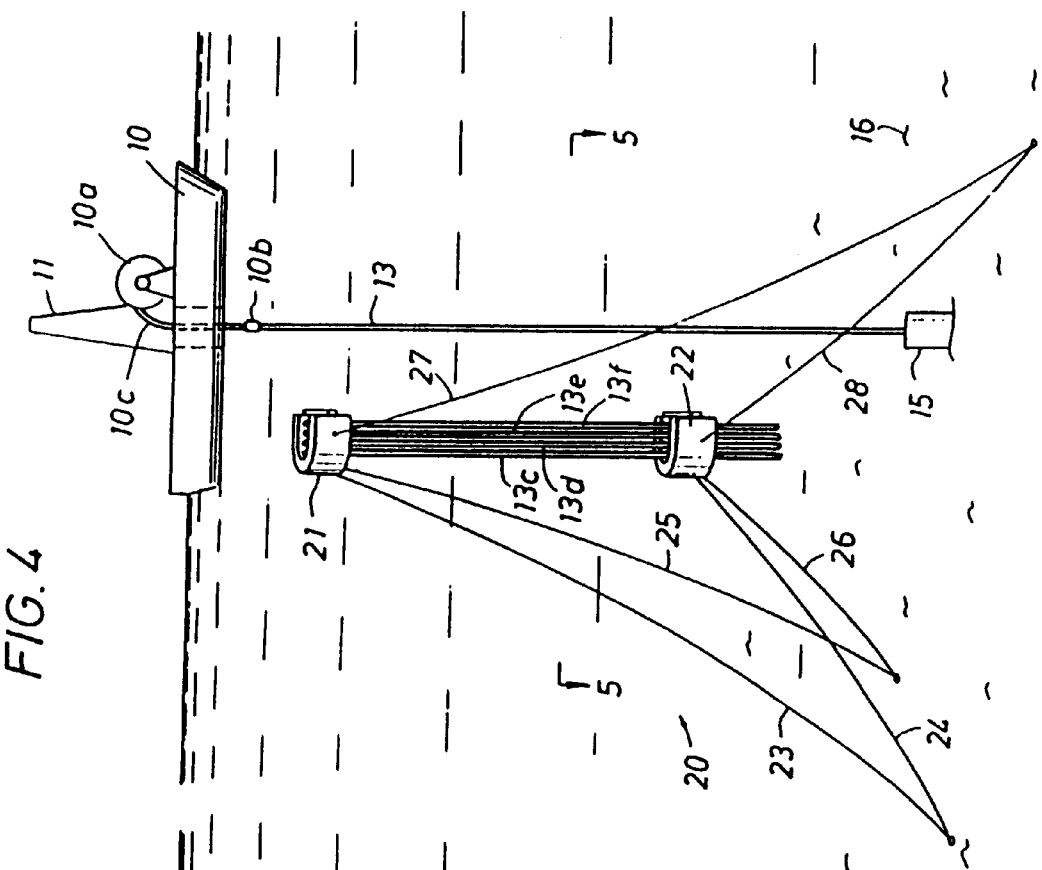
FIG. 4 is an elevation, in perspective, schematically illustrating a submerged, buoyant racking structure of the present invention guyed to the sea floor adjacent a riserless drilling assembly.

FIG. 4 illustrates additional details in a submerged buoyant racking system 20 arranged to rack pipe from the string 13 being removed from a well drilled without a marine riser. The pipe is racked without being draw above the rig floor.

Guy lines 25 and 26 and guy lines 27 and 28 cooperate with the guy lines 23 and 24 to form a three point structure that secures the racking system 20 against vertical and lateral movement.

The components 21 and 22 of the structure 20 are adjustably buoyant bodies in which the buoyancy may be altered by filling or displacing saltwater from chambers contained within the bodies. Movement of individual sections of drill pipe, 13c, 13d, 13e, and 13f, into and out of the racking assembly can be accomplished using a remotely operated vehicle (ROV) (not illustrated), diver assistance, or other suitable method.

FIGS. 2 and 4 also illustrate a rotary powered reel 10a from which steel cable 10c may be spooled and unspooled to raise and lower the string 13. The end of the cable 10b is secured to the top of the string 13. The string is raised or lowered by respectively reeling in or reeling out the cable from the spool 10a. The cable 10b is illustrated in dotted line in FIG. 2. This arrangement permits continuous movement of the string between the drill ship and the subsurface wellhead 15 without requiring the reciprocating motion employed by the traveling block or top drive.

Figure 5:
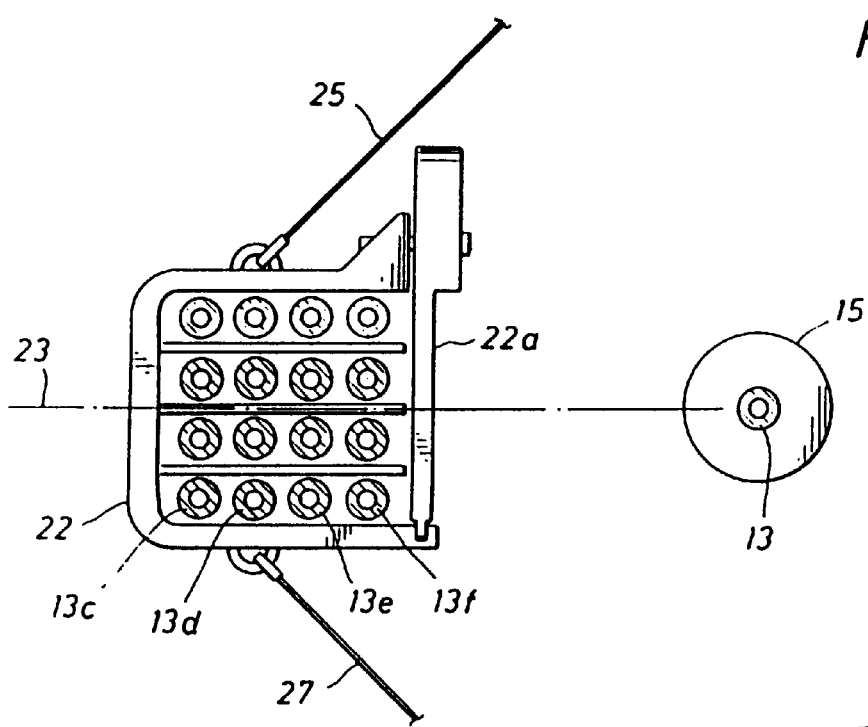
FIG. 5 is a horizontal cross section taken along the line 5—5 of FIG. 4 schematically illustrating details in a racking structure of the present invention.

FIG. 5 illustrates details in the lower section 22 of the racking system 20. The pipe string sections such as 13c–13f are secured in racks carried in the buoyant section 22. A remotely operated gate 22a holds the pipe in the buoyant section 22 until such time as a section of pipe is to be removed to be added to the string 13.

Figure 6:
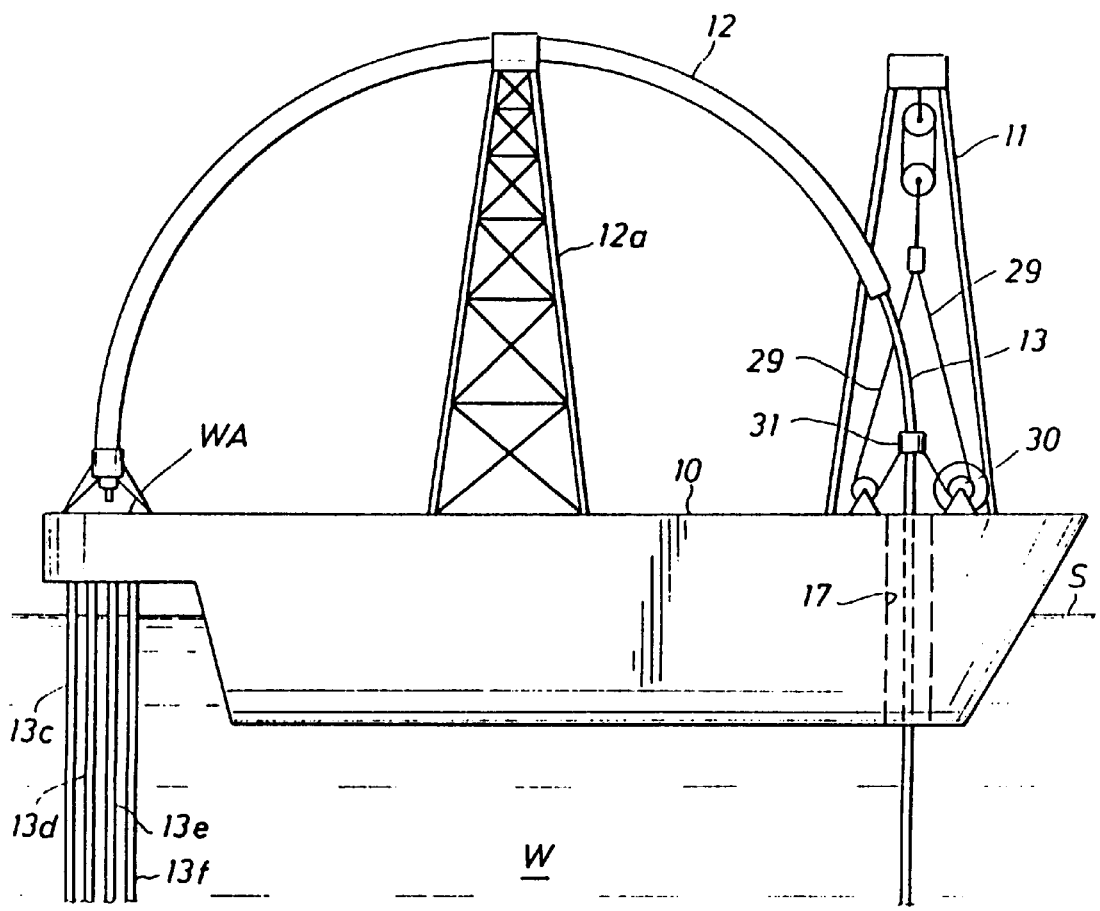
FIG. 6 is a vertical elevation of the invention of the present application schematically illustrating a curving guide supported by a tower directing the pipe from the first work area over the moon pool to a second work area at the side of the drilling vessel.

FIG. 6 illustrates a drilling vessel employing a central support tower 12a for providing intermediate support to the arching guide 12 through which the pipe 13 is directed. The guide 12 extends from the mast 11 to a work area WA. Personnel and equipment operating in the work area WA disconnect sections of the string 13 and hang off the pipe in stands such as 13c, 13d, 13e and 13f.

The drilling rig is equipped with an inserting arrangement operated by the vertical movement of the traveling block in the mast 11. Flexible lines 29 extend around pulleys 30, anchored to the rig floor, and attach to a collar 31 that engages the pipe 13. When the traveling block of the mast 11 is raised, the inserting arrangement pulls the collar 31 downwardly, forcing the pipe 13 into the well. The inserting arrangement per se is conventional.

Figure 7:
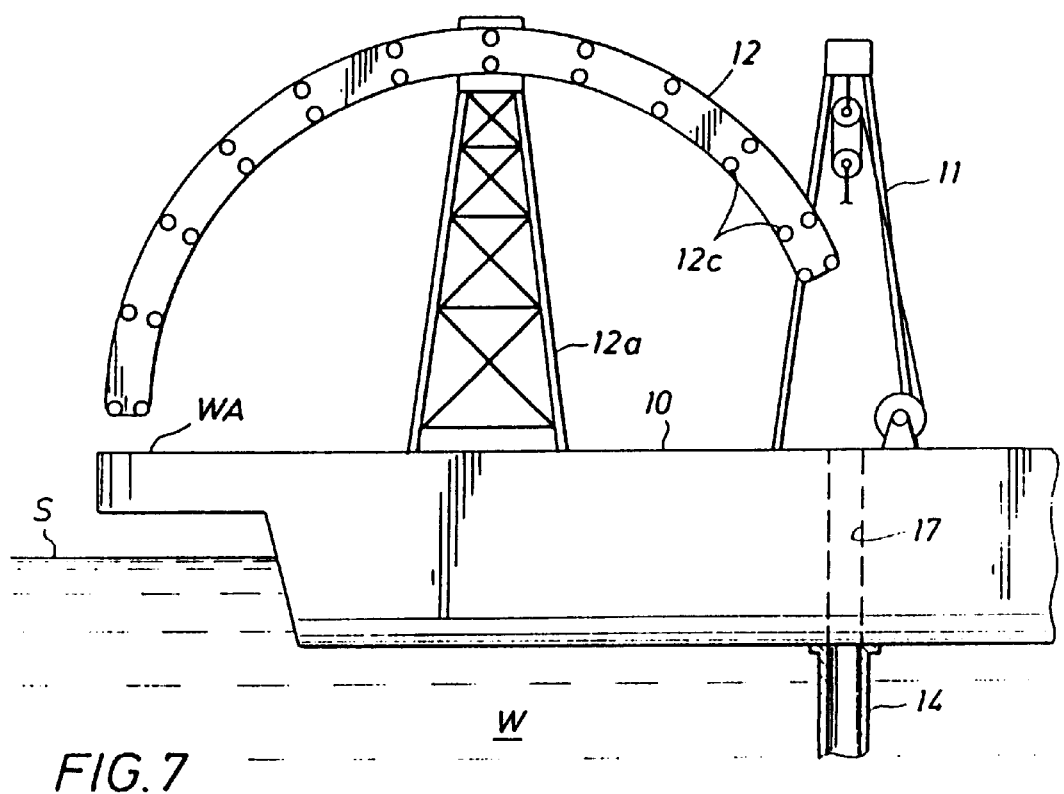
FIG. 7 is a vertical elevation schematically illustrating an assembly of the present invention employing an arching bearing guide for directing the pipe from the drilling rig floor to the work area at one end of the drilling vessel.

FIG. 7 illustrates a guide 12 equipped with rollers 12c that assist in moving pipe contained within the guide. The guide may be supported by a tower 12a.

Figure 8:
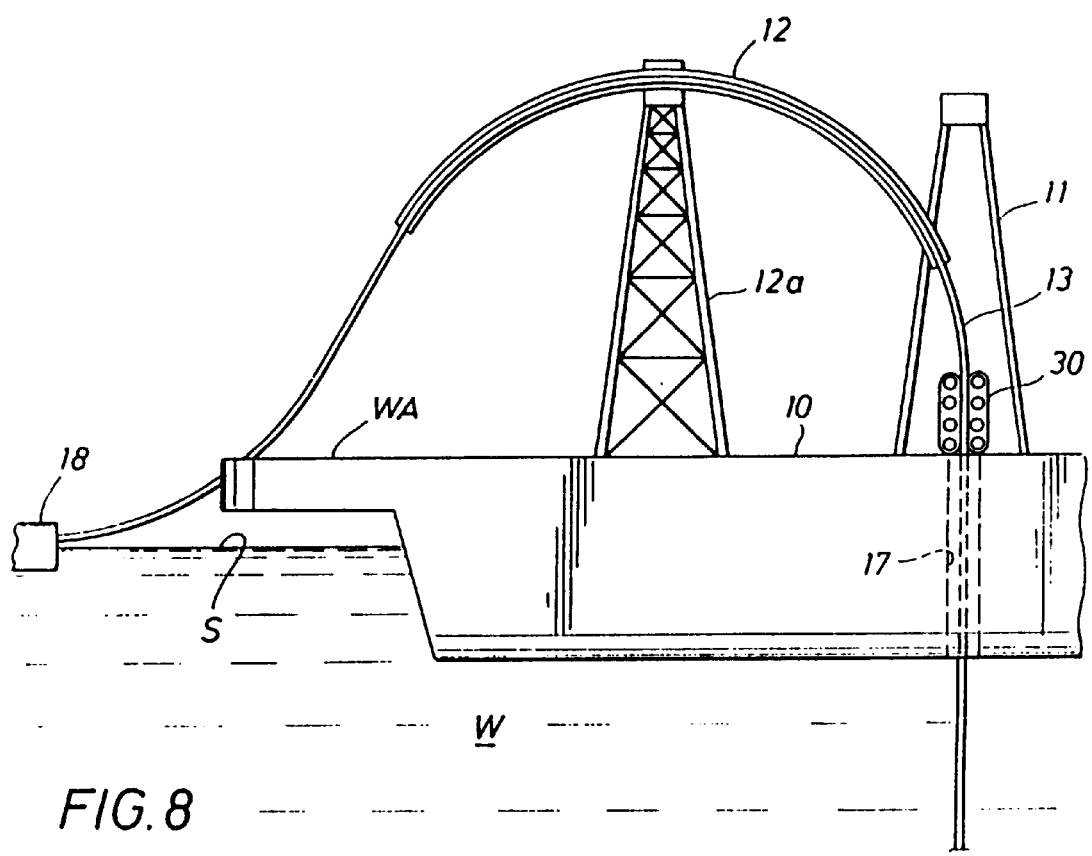
FIG. 8 is a vertical elevation schematically illustrating a positive pipe drive assembly driving the well string through an arching guide.

FIG. 8 illustrates a system with a positive drive 30 that can move the pipe string 13 into and out of the well. The positive drive 30 may be constructed in the manner employed in prior art driving systems used to propel pipe into and out of a well.

Figure 9:
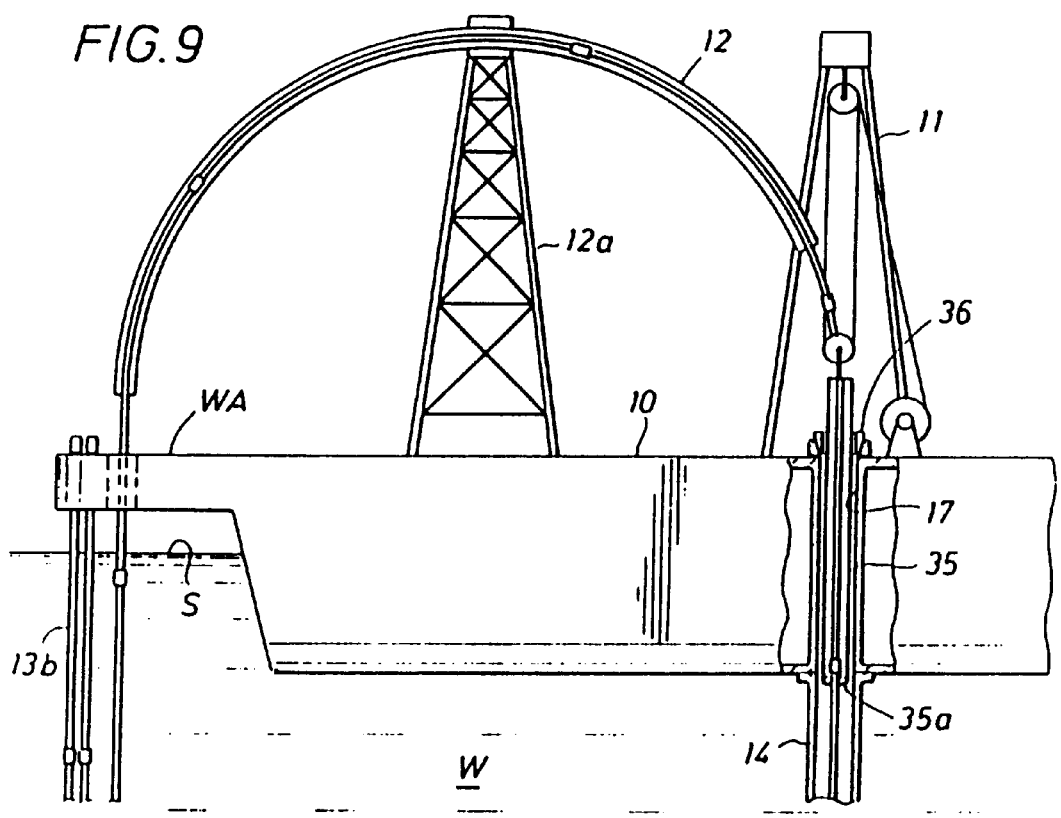
FIG. 9 is a schematic, vertical elevation illustrating a reciprocating, positive drive at its lower position preparing to move the well pipe through an arching guide to a work area at one end of the drilling vessel.

FIG. 9 illustrates the system of the present invention employing a reciprocating traveling block arrangement in a mast 11. Long bails 35 extend below the rig floor and into the moon pool 17. An elevator 35a is secured to the pipe to engage the pipe so that it is withdrawn from the well as the traveling block moves upwardly through the mast 11. Slips 36 are displaced from the moon pool while the bails 35 and elevator 35a are received within the moon pool. The system is at the bottom of its reciprocating position in FIG. 9.

Figure 10:
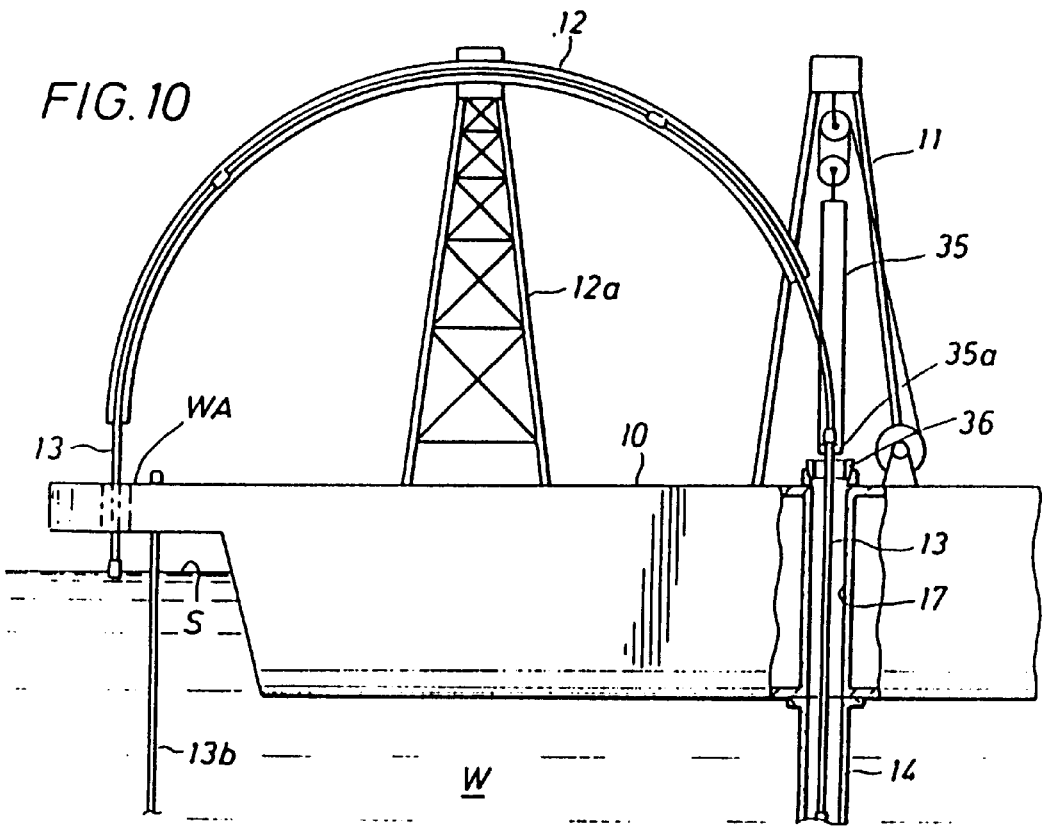
FIG. 10 is a vertical elevation schematically illustrating the reciprocating, positive drive of FIG. 9 at its elevated position powering pipe through the arching guide.

FIG. 10 illustrates the system at the top of its reciprocating position directing the pipe 13 into the guide 12. The slips 36 are actuated to engage with the pipe 30 to support the pipe string as the bails 35 and elevator 35a are lowered to engage the string 13 at a point below the drilling rig floor to repeat the lifting process.

FIG. 11 illustrates a system in which the pipe exiting the guide 12 is directed by a pivoting guide sleeve 40 into the roller guide 42 at the top of the support tower 41. The guide sleeve 40 is employed to convey the end of the string 13 as it exits the guide 12 into one end of the guide 42. As may be seen by joint reference to FIGS. 12 and 13, two arms 40a extend between a pivot point 40b and the guide sleeve 40. The assembly assists in stabilizing the pipe 13 as it moves from the guide 12 to the sleeve 42 and ensures that the end of the pipe enters the open end of the roller guide 40. FIG. 12 illustrates details in the construction of the roller guide 42.

Figure 14:
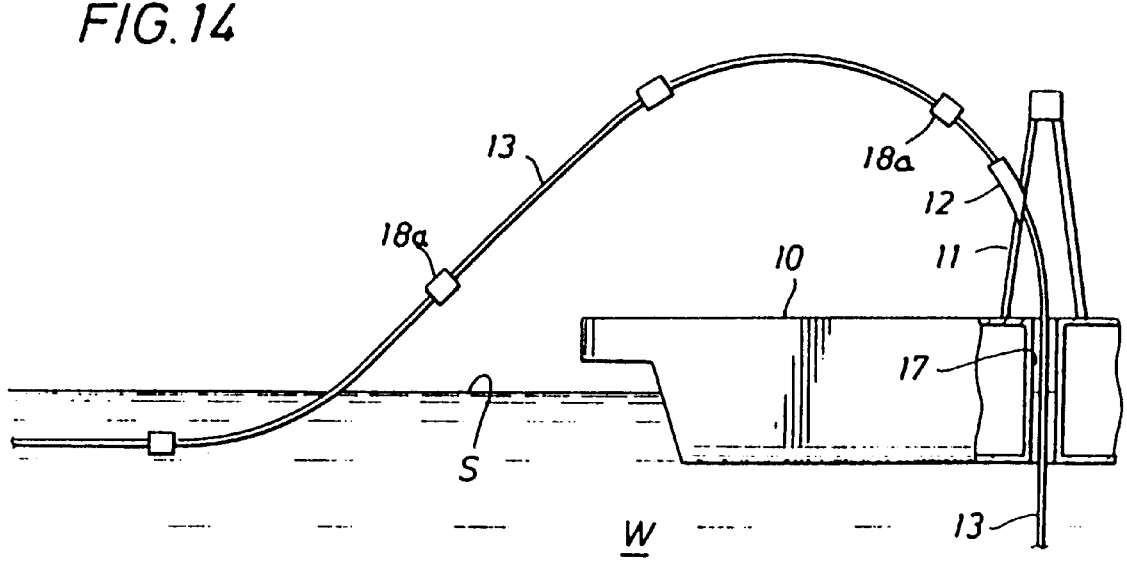
FIG. 14 is a vertical elevation schematically illustrating the system of the present invention using a single guide supported by the drilling derrick directing the well pipe from the side of the drilling derrick directly into the sea.

FIG. 14 illustrates a pipe string 13 extending from a short guide 12 carried by the mast 11. The string 13 extends directly from the guide into the seawater following the natural arc imposed by the weight of the string. Flotation devices 18a are applied to the string 13 as it exits the guide 12.

Figure 15:
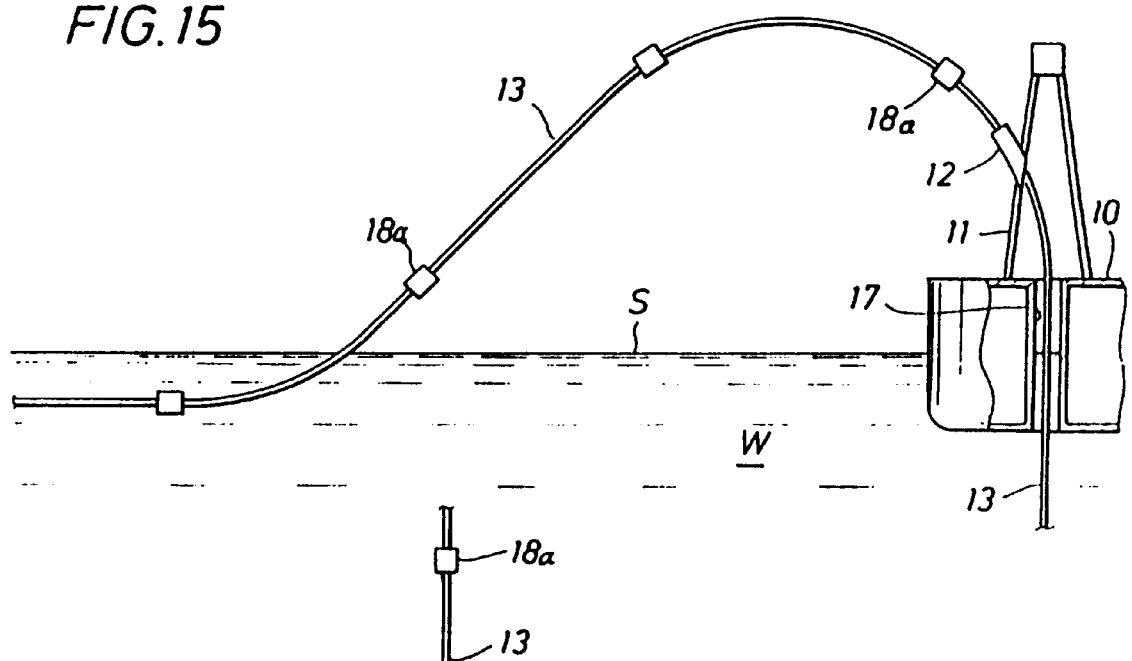
FIG. 15 is a vertical elevation schematically illustrating the well pipe being directed from the side of the drilling derrick directly into the sea from the near end of the drilling vessel.

FIG. 15 illustrates the well pipe being directed from the side of the mast 11 through a guide 12 and directly into the sea at the near end of the drilling vessel 10.

Figure 16:
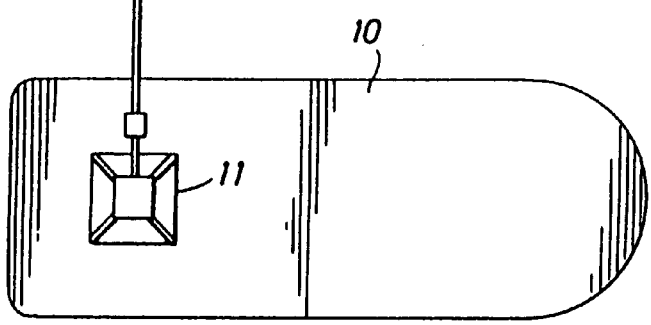
FIG. 16 is a plan view of the assembly illustrated in FIG. 15 schematically illustrating the well pipe being directed from the drilling derrick directly into the sea alongside the drilling vessel.

FIG. 16 illustrates the pipe string 13 being directed over the side of the drilling vessel.

Figure 17:
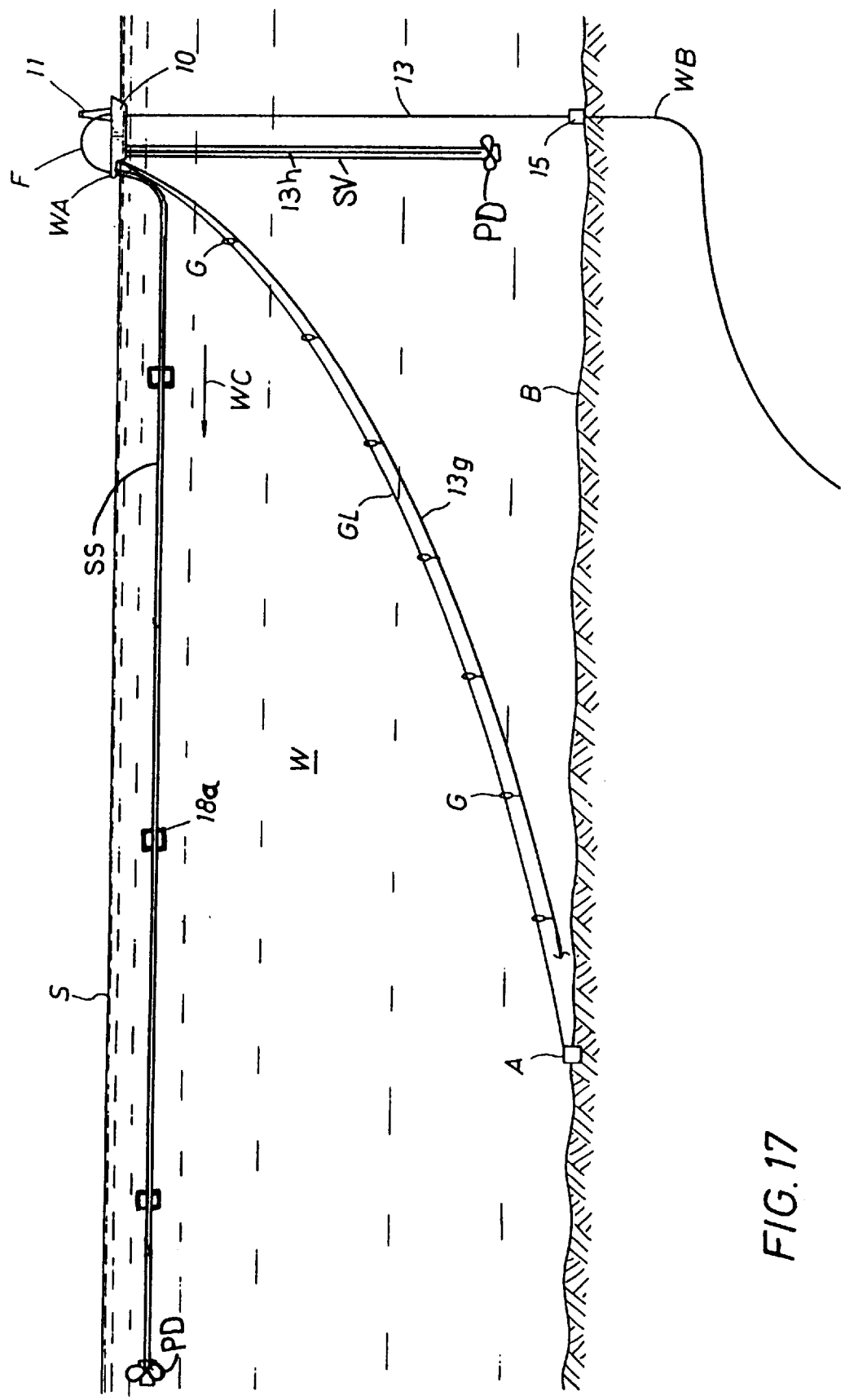
FIG. 17 is a vertical elevation schematically illustrating and vertical storage sleeves and an anchored guy line storage system disposed within the sea.

FIG. 17 is an elevation illustrating an offshore drilling rig 10 with a derrick 11. The drilling rig 10 is at the surface of a body of water W. The drilling rig 10 may be a floating rig, a semi-submersible rig, a bottom-supported rig, or any other water-deployed drilling platform employed in the drilling of wells.

A pipe string 13 extends between the rig 10 and a subsurface wellhead 15 located along the bottom B of the body of water W. The pipe 13 extends through the wellhead 15 and into a well bore WB. A riser assembly (not illustrated) may also extend between the rig 10 and the wellhead 15. The pipe 13 may be a drill pipe or other tubular pipe assembly employed in a drilling or completion system. For purposes of the following description, the pipe assembly 13 will be treated as a drill pipe in a riserless drilling assembly.

The drill pipe 13 extends through the moon pool (not illustrated) of the rig 10 and through the side of the derrick 11, forming an arch F that curves down toward the end of the rig 10 and enters a submerged storage sleeve SS. Flotation devices 18a are secured along the length of the submerged storage sleeve SS to maintain the sleeve at one desired depth below the water surface. The floatation devices may be remotely controlled to regulate the depth of the string storage sleeve SS below the water surface.

A section 13h of the drill string is stored in a vertical storage sleeve SV. Propulsion devices PD are connected to the sleeve SS and SV to move the sleeve through the water. The propulsion devices may be electrically powered propellers that receive power and control signals over electrical conductors (not illustrated) secured to the storage sleeve and extending to the rig 10. The propulsion device PD may be remotely controlled from the drill ship to maintain the storage sleeve SS and SV in a desired orientation relative to the rig 10 to overcome the effects of current and heading charges of the rig.

It will be understood that the propulsion devices SS and SV may be employed with any of the modifications of the invention as required to maintain a desired orientation of the stored pipe. It will also be appreciated that the propulsion device may comprise a surface vessel that connects to the storage sleeve or pipe and maneuvers as necessary to maintain a desired orientation of the pipe.

FIG. 17 illustrates an additional technique for storing a continuous string of pipe 13g. A guy line GL, secured to the water bottom B at anchor A, extends to the drill ship 10. Sliding guides G secure the pipe string 13g to the guy line GL. As the pipe 13g is lowered into the water, the guides G slide along the guy line GL. The attachment of the string 13g to the guy line GL prevents the current WC from moving the string through the water. A single string 13g or multiple long string segments (not illustrated) may be stored in this manner. Additional lines GL are provided for each additional string to be stored.

Figure 18:
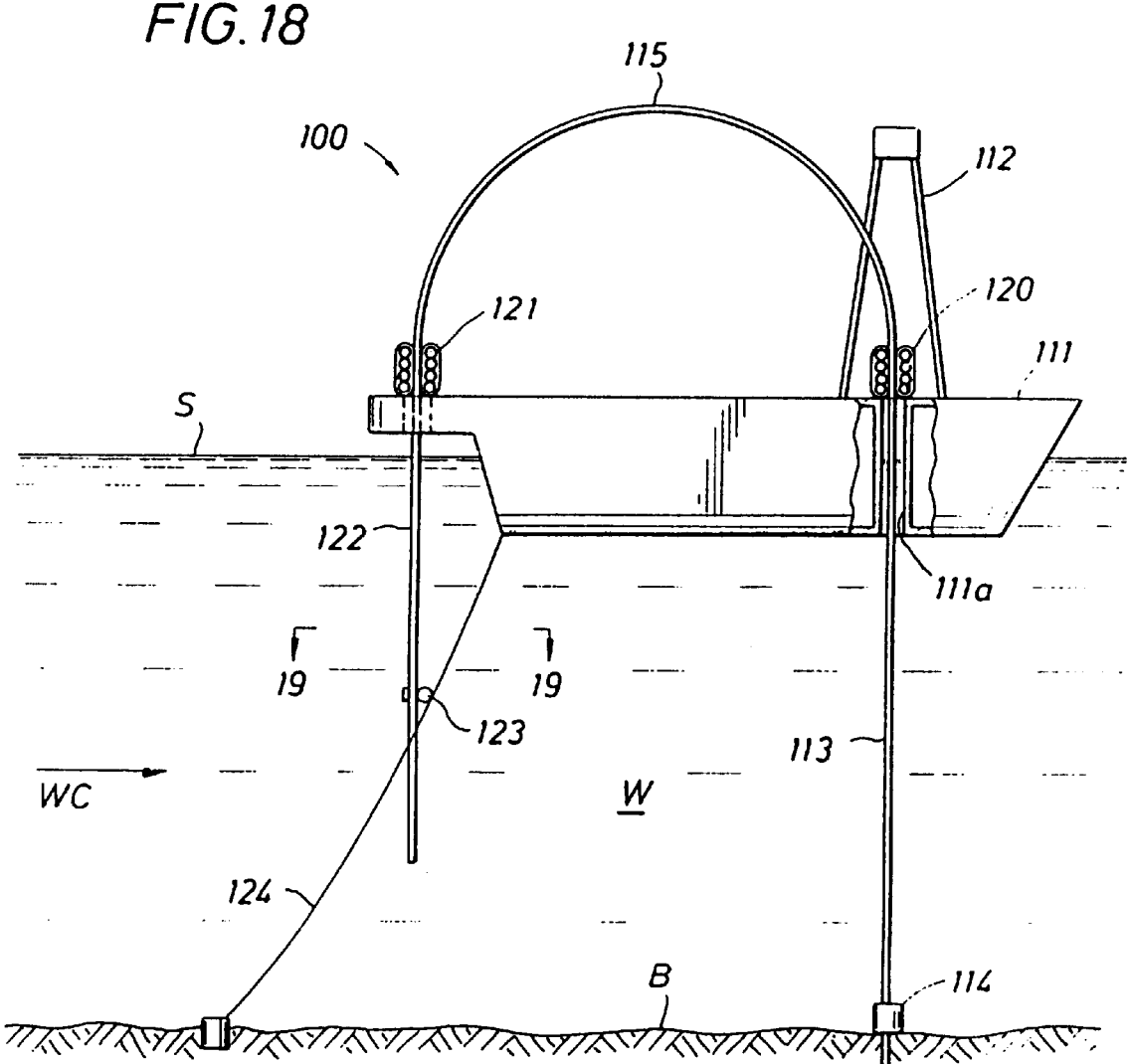
FIG. 18 is a vertical elevation schematically illustrating positive pipe drive mechanisms on the drilling rig floor and in a remote work area for moving the well pipe between the storage area and the well bore.

FIG. 18 illustrates a system of the invention generally at 100. The System 100 includes a floating drilling rig 111 having a mast 112. The rig 111 is floating on the surface S of a body of water W above a sea floor B. A drill string 113 extends through a subsea wellhead 114 into a well bore WB.

The drill pipe 113 extends through a moon pool 11a, through a positive drive mechanism 120, and through the mast 112 to a second positive drive mechanism 121. The drill pipe 113 extends in a semicircular arch 115 as it extends from the positive drive system 120 to the positive drive system 121. The pipe sections extending through the positive drive section 121 are lowered directly into the body of water W for racking.

Figure 19:
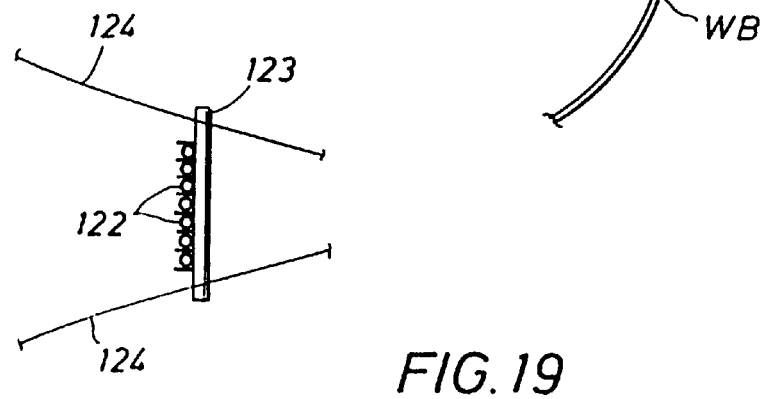
FIG. 19 is a cross-section taken along the line 19—19 of FIG. 18 schematically illustrating details in an underwater racking arrangement for preventing the water current from displacing the suspended stands of pipe from their vertical position.

As may best be seen by joint reference to FIGS. 18 and 19, multiple sections 122 of drill pipe 113 are suspended from the drilling rig 111 for storage in the water W. One or more restraining members, such as the member 123, engage the sections 122 to prevent the suspended pipe sections from moving in the direction of the water current WC. Anchoring lines 124 extending from the sea floor B to the drilling rig 111 are employed to hold the restraining member 123 in position.

While preferred forms of the present invention have been described herein, various modifications of the apparatus, system and method of the invention may be made without departing from the spirit and scope of the invention. By way of example rather than limitation, the invention may be employed on land-based drilling rigs. When the invention is used on a land rig, the pipe string is bent from the derrick and directed onto the surface of the land surrounding the rig. The string is then disposed in a rectilinear configuration in the space surrounding the rig for storage, inspection, or other treatment. The string is rerun into the well by returning the string through the pipe guide in the derrick and inserting it into the well through the drilling floor.

What is claimed is:

1. A method of handling pipe used by a drilling rig in the construction of a well comprising:

forming a pipe string by assembling multiple pipe joints end-to-end, said pipe joints having a minimum radius of curvature below which said pipe joints may not be curved without yielding;

moving said pipe string between first and second laterally spaced areas along a path that curves at least 90°, said path having a radius of curvature that is greater than the minimum radius of curvature of said pipe joints; and storing said pipe string in a body of water adjacent said rig.

2. A method as defined in claim 1 wherein said first area is a floor of said drilling rig.

3. A method as defined in claim 1 wherein said second area is an area remote from a floor of said drilling rig.

4. A method as defined in claim 1 wherein said pipe string is withdrawn through a floor of said drilling rig at said first area and directed onto, or into, said body of water at an area remote from said floor of said drilling rig.

5. A method as defined in claim 1, further comprising:
moving said pipe string through a floor of said drilling rig at said first area;
moving said pipe string through a guide above said floor; and
moving said pipe string from said guide to a work area at said second area.

6. A method as defined in claim 5, further comprising
disconnecting segments of said pipe string at said work area; and
storing said segments in said body of water.

7. A method as defined in claim 1, further comprising securing flotation material to said pipe string for supporting said pipe string in said body of water.

8. A method as defined in claim 1, further comprising the step of structurally guiding said pipe string from said first area to said second area whereby said pipe string is structurally supported as said pipe string extends between said first area and said second area.

9. A method as defined in claim 1 wherein said pipe string is disassembled and stored in stands extending from said second area into said body of water.

10. A method as defined in claim 1 wherein said pipe string is withdrawn from said body of water at said second area and inserted into a well at said first area.

11. A system for the drilling, working over or completing of wells from a drilling rig comprising:
a drive mechanism included with said drilling rig to raise or lower a pipe string in a well at a first area on said drilling rig;
a guide included with said drilling rig for directing said string between said first area and a second area located laterally away from said first area, said guide assisting in directing said string to curve at an angle exceeding 90° between said first and second areas; and
a pipe storage facility located in a body of water at said second area for receiving and storing said pipe string in a rectilinear configuration.

12. A system as defined in claim 11 further including a storage sleeve at said second area for receiving and storing said pipe string.

13. A system as defined in claim 12 wherein said drilling rig comprises an offshore drilling facility and said second area comprises an area of a body of water in a space surrounding said offshore drilling facility.

14. A method of handling pipe used in well construction, comprising:
withdrawing a rectilinearly configured length of pipe from a well, said length of pipe being constructed of a material having a bending radius of curvature beyond which it may not be bent without yielding said material;
bending the withdrawn length of pipe along an arcuate path toward a storage location without exceeding said bending radius of curvature;
restoring the bent length of pipe to a rectilinear configuration; and
storing the length of said pipe at a storage location in a rectilinear configuration.

15. A method as defined in claim 14 wherein said length of pipe comprises multiple joints of pipe joined end-to-end to form a pipe string.

16. A method as defined in claim 14 wherein said storage location comprises the space surrounding a drilling structure.

17. A method as defined in claim 14 wherein said space comprises a body of water.

18. A method of handling an elongate pipe string made up of multiple pipe sections and used in well construction, said pipe sections being constructed of a material having a bending radius of curvature beyond which said pipe sections may not be bent without yielding said material, comprising:
moving said elongate pipe string from a rectilinear configuration at a storage location to a guide for arching said pipe string along an arcuate path to a well;
bending said pipe sections along said guide without exceeding said bending radius of curvature;
restoring the rectilinear configuration of said pipe string; and
inserting the rectilinear pipe string into a well.

19. A method of handling a pipe string as defined in claim 18 wherein said pipe string is stored in a rectilinear sleeve at said storage location.

20. A method of handling a pipe string as defined in claim 18 wherein said storage location comprises the space surrounding a drilling structure.

21. A method of handling a pipe string as defined in claim 20 wherein said storage space comprises a body of water.

22. A method of handling a pipe string as defined in claim 21 wherein said pipe string is stored in at least one segment supported from said drilling structure and extending vertically into said body of water.

23. A method of handling a pipe string as defined in claim 21 wherein said pipe string is stored at said storage location in an orientation extending laterally away from said well along or below the surface of said body of water.

24. A method of handling a pipe string as defined in claim 21 wherein said pipe string is stored in one or more segments supported from a buoyant racking structure separate from a drilling structure.

25. A method of handling a pipe string as defined in claim 21 wherein said pipe string is stored in one or more segments supported from said drilling structure and extending vertically into said body of water.

26. A method of handling a pipe string as defined in claim 18 wherein said pipe string is stored substantially horizontally along or below the surface of said body of water.

27. A method of handling a pipe string as defined in claim 18 wherein said pipe string is stored in one or more segments supported from a buoyant racking structure separate from a drilling structure.

28. A method of handling pipe used in constructing a well through a water body with a drilling rig, said drilling rig having a derrick located above a substructure and a moon pool, comprising:
placing an elongate storage sleeve into said water body at a location laterally spaced from said substructure and said moon pool;
storing said pipe in said storage sleeve;
removing said pipe from said storage sleeve; and
using said pipe to construct said well.

29. A method as defined in claim 28 further including moving said pipe along a curved path between said well and said storage sleeve.

30. A method of handling pipe for well construction, comprising:
assembling a length of pipe into a rectilinear configuration, said length of pipe being constructed of a material having a bending radius of curvature beyond which said length of pipe may not be bent without yielding said material;
moving said length of pipe through a guide for bending said length of pipe along an arcuate path toward a well as said length of pipe is moved toward said well, said arcuate path having a radius greater than said bending radius of curvature;

restoring the rectilinear configuration of said length of pipe; and inserting said length of pipe into said well.

31. A method of handling pipe for well construction as defined in claim 30 wherein said length of pipe is processed at a storage area.

32. A method of handling pipe for well construction as defined in claim 31 wherein said storage area is a body of water surrounding a drilling structure.

33. A method of handling pipe for well construction as defined in claim 30 wherein said length of pipe comprises multiple joints of pipe joined end-to-end to form a pipe string.

34. A method for handling pipe used in well construction comprising:

assembling a rectilinear pipe string at a first location, said rectilinear pipe string being constructed from a material having a bending radius of curvature beyond which it may not be bent without yielding said material;

transporting said rectilinear pipe string to a second location that includes a well;

bending said pipe string from a rectilinear configuration to a curved configuration and back to a rectilinear configuration without exceeding said bending radius of curvature; and inserting said pipe string in said rectilinear configuration into said well.

35. A method for handling pipe as defined in claim 34:

said first location comprises an assembly facility;

said second location comprises an offshore drilling location; and said rectilinear pipe string is transported from said first to said second location by towing said rectilinear pipe string through a body of water separating said first and second locations.

36. A method as defined in claim 35 wherein:

said rectilinear pipe string is moved from said second location to a guide for arching said pipe string along an arcuate path to said well; and said pipe string is returned to a rectilinear configuration before being inserted into said well.

37. A method for handling pipe as defined in claim 36 wherein said pipe string comprises multiple joints of pipe joined end-to-end to form said pipe string.

38. A method of handling pipe used in well construction on a drilling rig having a mast comprising extracting pipe comprised of multiple pipe sections connected together to form a pipe string from said well in continuous lengths that exceed the height of said mast without separating said continuous lengths into segments of shorter length than said mast and without bending said lengths beyond a bending radius of curvature beyond which said lengths may be bent without yielding; and storing said continuous lengths of pipe in a water body surrounding said drilling rig.

39. A method of handling pipe used in well construction as defined in claim 38 wherein said continuous lengths are stored in a space formed between said drilling rig and the bottom of said body of water.

40. A method of handling pipe used in well construction as defined in claim 38 wherein said continuous lengths are moved laterally in said water body between a storage location and said well.

41. A method of handling pipe used in constructing a well through a water body, comprising:

placing an elongate storage sleeve into said water body;

storing said pipe in said storage sleeve;

removing said pipe from said storage sleeve;

using said pipe to construct said well; and placing a treating fluid in said storage sleeve.

42. An apparatus for handling pipe used in constructing a well, comprising:

a rig having a derrick for raising and lowering a string of pipe in a well;

a guide for directing pipe laterally in a string between said well and a water area remote from said well; and a storage sleeve externally of said well for receiving and storing said pipe in said water area.

43. An apparatus as defined in claim 42, further comprising a positive drive mechanism for moving said pipe string between said well and said storage sleeve.

44. An apparatus as defined in claim 42 wherein said guide is adapted to direct a string of pipe laterally through said derrick.

45. An apparatus as defined in claim 42 wherein said rig comprises an offshore drilling structure.

46. An apparatus as defined in claim 42 wherein said storage sleeve comprises a tubular pipe body.

47. A system for handling a string of jointed pipe used in constructing a well drilled through a body of water, comprising:

a well drilling structure for moving pipe through a well drilling area on said drilling structure;

a storage area in said body of water in the space surrounding said drilling structure for storing a rectilinear string of pipe formed from multiple pipe joints connected together, said string of pipe constructed of a material providing a yielding radius of curvature for said string of pipe beyond which said string of pipe may not be curved without yielding, a guide for directing pipe in a curving path from said well drilling area to said storage area, said curving path having a radius of curvature greater than the yielding radius of curvature of said string of pipe;

a positive drive mechanism for driving said string of pipe through said guide between said well drilling area and said storage area; and storage facilities in said storage area for retaining said rectilinear string of pipe in said storage area.

48. A system as defined in claim 47, further comprising a work area on said drilling structure, intermediate said well drilling area and said storage area, for processing pipe that is moved between said well drilling area and said storage area.

49. A system as defined in claim 47 wherein said drilling structure comprises a structure adapted to drill wells through a surface body of water.

50. A system as defined in claim 49, comprising a pipe racking structure adjacent said work area for suspending said pipe from said drilling structure in one or more vertical lengths of pipe.

51. A system as defined in claim 49 wherein said drilling structure is a buoyant structure.

52. A system as defined in claim 51 wherein said drilling structure is a drill ship.

53. A system for handling a string of jointed pipe used in constructing a well, comprising:

a well drilling structure adopted to drill wells through a surface body of water for moving pipe through a well drilling area on said drilling structure;

a storage area in the space surrounding said drilling structure for storing a rectilinear string of pipe formed from multiple pipe joints connected together, said string of pipe constructed of a material providing a yielding radius of curvature for said string of pipe beyond which said string of pipe may not be curved without yielding;

a guide for directing pipe in a curved path from said well drilling area to said storage area, said curing path having a radius of curvature greater than the yielding radius of curvature of said string of pipe;

a positive drive mechanism for driving the string of pipe through said guide between said well drilling area and said storage area;

storage facilities for retaining said rectilinear string of pipe in said storage area; and a guy line for connection between said drilling structure and an anchor point at the bottom of said body of water.

54. A system for handling pipe used in the construction of a well drilled through a body of water, comprising:

a support structure adapted to support a well drilling rig at a surface of a body of water;

a pipe string adapted to extend between said drilling rig and a well entry point at a bottom of said body of water;

a pipe storage facility adapted to be at least partially disposed in a space between said support structure and said bottom of said body of water; and a handling mechanism for moving pipe laterally in said space.

55. A system as defined in claim 54 wherein said pipe string comprises a riser pipe adapted to extend between said support structure and said well entry point and said storage area is contained within said riser pipe.

56. A system as defined in claim 54 wherein said pipe string is adapted to be used in riserless drilling and said storage area is adapted to be the water in a space laterally alongside said pipe string.

57. A method of handling jointed pipe on a drilling rig having a drilling derrick, comprising:

assembling a string of pipe from multiple individual pipe sections, said string of pipe having a total length greater than the length of said drilling derrick;

storing said string of pipe at a storage location in the water adjacent said drilling rig;

removing said string of pipe from said storage location; and constructing a well with said string of pipe.

58. A method as defined in claim 57 further including storing said string of pipe in a storage sleeve at said storage location.

59. A method as defined in claim 57 further including moving said string of pipe through said water to maintain a desired orientation of said pipe string relative to said well.

60. A method as defined in claim 58 further including placing a treating fluid in said storage sleeve.

61. A method as defined in claim 58 further including moving said string of pipe through said water to maintain a desired orientation of said pipe string relative to said well.

62. A method as defined in claim 61 further including the step of placing a treating fluid in said storage sleeve.

63. A method of handling pipe used in the construction of a well by a drilling rig operating through a water body comprising storing a major portion of a separate length of pipe in said water body in an area between said drilling rig and a bottom of said water body at a location laterally displaced from a substructure area and a moon pool area of said drilling rig.

64. A method as defined in claim 63 comprising assembling two or more of said separate lengths of pipe to form a pipe string; and performing construction work on said well with said pipe string.

65. A method as defined in claim 63 further comprising placing said separate lengths of pipe in one or more storage sleeves disposed in said water body.

66. A method as defined in claim 63 comprising vertically disposing said pipe lengths in said water body.

67. A method of handling jointed pipe on a drilling rig having a drilling derrick, comprising:

assembling a string of pipe from multiple individual pipe sections, said string of pipe having a total length greater than the length of said derrick;

storing said string of pipe at a storage location in the water adjacent said drilling rig;

removing said string of pipe from said storage locations without disassembling individual pipe sections to shorten said string of pipe; and constructing a well with said string of pipe.

68. A method as defined in claim 67 further comprising storing said string of pipe in a storage sleeve at said storage location.

69. A method as defined in claim 68 further comprising moving said string of pipe through said water to maintain a desired orientation of said pipe string relative to said well.

70. A method as defined in claim 69 further comprising placing a treating fluid in said storage sleeve.

71. A method as defined in claim 68 further comprising moving said string of pipe through said water to maintain a desired orientation of said pipe string relative to said well.

72. A method as defined in claim 71 further including placing a treating fluid in said storage sleeve.

73. A method of handling an elongate pipe string made up of multiple pipe sections and used in well construction, comprising:

moving said elongate pipe string from a rectangular configuration at a storage location to a guide for arching said pipe string along an arcuate path to a well;

restoring the rectilinear configuration of said pipe string;

inserting the rectilinear pipe string into a well; and storing said pipe string along a guy line extending between a bottom of said body of water and said drilling structure.

74. A method of handling an elongate pipe string made up of multiple pipe sections and used in well construction, comprising:

moving said elongate pipe string from a rectilinear configuration at a storage location comprising a body of water in the space surrounding a drilling structure to a guide for arching said pipe string along an arcuate path to a well;

restoring the rectilinear configuration of said pipe string;

inserting the rectilinear pipe string into a well; and storing said pipe string along a guy line extending between the bottom of said body of water and said drilling structure.

75. A method of handling pipe using constructing a well through a water body, comprising:

placing an elongate storage sleeve into said water body;

storing said pipe in said storage sleeve;

removing said pipe from said storage sleeve;

using said pipe to construct said well; and testing said pipe in said storage sleeve.

76. A method of handling pipe using constructing a well through a water body, comprising:

placing an elongate storage sleeve into said water body;

storing said pipe in said storage sleeve;

removing said pipe from said storage sleeve;

using said pipe to construct said well; and moving said storage sleeve through said water body to maintain a desired orientation of said storage sleeve relative to said well.

77. A method of handling pipe using constructing a well through a water body, comprising:

placing an elongate storage sleeve into said water body;

storing said pipe in said storage sleeve;

removing said pipe from said storage sleeve;

using said pipe to construct said well; and securing said storage sleeve to a guy line connected with a bottom of said water body to maintain a desired position of said storage sleeve relative to said well.

\* \* \* \* \*

UNITED STATES PATENT AND TRADEMARK OFFICE
CERTIFICATE OF CORRECTION

PATENT NO. : 6,250,395 B1  
DATED : June 26, 2001  
INVENTOR(S) : Carlos A. Torres Page 1 of 1

It is certified that error appears in the above-identified patent and that said Letters Patent is hereby corrected as shown below:

Column 13,  
Lines 15-16, delete "the step of".

Column 15,  
Line 31, after 34 insert -- wherein --.

Column 17,  
Line 9, delete "curing" and insert therefor -- curving--.  
Lines 59 and 60, delete "the step of".

Column 18,  
Line 61, delete "using" and insert therefor -- used in --.

Column 19,  
Line 4, delete "using" and insert therefor -- used in --.

Column 20,  
Line 1, delete "using" and insert therefor -- used in --.

Signed and Sealed this

Fifth Day of February, 2002

*Attest:*

*Attesting Officer*

JAMES E. ROGAN  
*Director of the United States Patent and Trademark Office*